US012570470B2

(12) United States Patent
Desmet

(10) Patent No.: US 12,570,470 B2
(45) Date of Patent: Mar. 10, 2026

(54) METHOD AND SYSTEM FOR DECANTING TO PARTIALLY FILLED RECEPTACLES

(71) Applicant: Dematic Corp., Grand Rapids, MI (US)

(72) Inventor: Stijn Desmet, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 287 days.

(21) Appl. No.: 18/181,911

(22) Filed: Mar. 10, 2023

(65) Prior Publication Data

US 2023/0286746 A1 Sep. 14, 2023

Related U.S. Application Data

(60) Provisional application No. 63/318,529, filed on Mar. 10, 2022.

(51) Int. Cl.
| | |
|---|---|
| *B65G 1/06* | (2006.01) |
| *B65G 1/04* | (2006.01) |
| *B65G 1/137* | (2006.01) |

(52) U.S. Cl.
CPC ............. *B65G 1/06* (2013.01); *B65G 1/0478* (2013.01); *B65G 1/0492* (2013.01); *B65G 1/1376* (2013.01); *B65G 1/1378* (2013.01)

(58) Field of Classification Search
CPC ...... B65G 1/0478; B65G 1/06; B65G 1/0492; B65G 1/1376; B65G 1/1378
See application file for complete search history.

(56) References Cited

U.S. PATENT DOCUMENTS

| | | |
|---|---|---|
| 2018/0085788 A1 | 3/2018 | Engel et al. |
| 2021/0221619 A1* | 7/2021 | Lert, Jr. ............... B65G 1/1378 |

| | | | |
|---|---|---|---|
| 2021/0241217 A1* | 8/2021 | Lert, Jr. ............... | G05D 1/0088 |
| 2021/0261335 A1 | 8/2021 | Lert et al. | |

FOREIGN PATENT DOCUMENTS

| | | |
|---|---|---|
| WO | 2020229973 A1 | 11/2020 |
| WO | 2021038437 A1 | 3/2021 |
| WO | 2021111440 A1 | 6/2021 |

OTHER PUBLICATIONS

International Search Report and Written Opinion from corresponding Patent Cooperation Treaty (PCT) Application No. PCT/IB23/52329, completed May 3, 2023.

* cited by examiner

*Primary Examiner* — Saul Rodriguez
(74) *Attorney, Agent, or Firm* — Gardner, Linn, Burkhart & Ondersma LLP

(57) ABSTRACT

A system and method are provided for decanting inbound goods into optimally dimensioned compartments of totes for storage in an ASRS storage system. The system includes decant workstations with multiple tote decant positions each dedicated to receive totes having a compartment configuration different than for those at the other decant positions. The method includes presenting a decant operator with multiple totes such that the operator substantially always has an empty or partially filled compartment of each available compartment size which to place inbound items into. A warehouse control system guides the operator to which presented tote and which compartment within that tote to place the items. The warehouse control system monitors each of the totes at the decant positions and once a tote's compartments are all filled to capacity, that tote is returned to the storage system and replaced with another tote having an identical compartment configuration.

22 Claims, 7 Drawing Sheets

METHOD AND SYSTEM FOR DECANTING TO PARTIALLY FILLED RECEPTACLES

CROSS REFERENCE TO RELATED APPLICATION

The present application claims priority of U.S. provisional application Ser. No. 63/318,529 filed Mar. 10, 2022, which is hereby incorporated herein by reference in its entirety.

FIELD OF THE INVENTION

The present invention is directed to an order fulfilment system, and in particular to decant operations within an order fulfilment system.

BACKGROUND OF THE INVENTION

Warehousing and order fulfillment facilities operate on a continual cycle of goods in via decant operations and goods out via order fulfilment operations. Automated storage and retrieval systems (ASRS) are commonly utilized to automate the storage and retrieval processes within such facilities. Decant processes within such facilities commonly include an operator whom picks inbound inventory items from a vendor case or unit load and places them in an inventory receptacle or tote that is positioned at a decant position of a decant workstation and the tote is subsequently transported to and stored in an ASRS. It is not uncommon for upstream processes (e.g. decant) to cause starvation at downstream processes (e.g. pick stations), and it is not uncommon for downstream processes to cause bottlenecking or choking at upstream processes.

Automated grid storage arrays or systems are commonly utilized as ASRS in warehouse settings due to grid storage array's efficient space usage as compared to other available automated warehousing solutions. Grid storage arrays may require a substantially smaller footprint than other common automated storage and retrieval systems, multi-shuttle systems for example. Thus, grid storage arrays provide certain advantages for small scale warehouses, such as those typically found in micro-fulfillment facilities (e.g. grocery stores, convenience stores, etc.). Grid storage arrays may be utilized as ASRS for both low-rate throughput and high-rate throughput operations in which physical space is limited. Aisle and shuttle based storage systems are also commonly utilized as ASRS in warehouse settings, such as large warehouses, particularly for handling high-rate throughput volumes. An exemplary aisle and shuttle storage system includes systems similar or substantially identical to the multi shuttle storage systems marketed and sold under the trademark MULTISHUTTLE® from Dematic Corp. of Grand Rapids, MI. For illustrative purposes, the exemplary MULTISHUTTLE® system is hereinafter referred to as "Dematic Multishuttle" or DMS.

Inventory totes are often compartmentalized or divided to provide delineations between products to make the picking processes more efficient and/or to accommodate products that are relatively small. Decanting into compartmentalized totes typically requires that all compartments of a tote be either completely depleted prior to receiving additional inventory items, and/or a decant operator may be required to adjust or rearrange dividers in the tote presented in order to accommodate a product they are decanting to the tote. In many facilities, the decant workstations are fed by a single access portal or port (e.g. grid based storage systems) or a unidirectional conveyor. Thus, totes for decant may be buffered either one tote at a time or in a long line of totes making it unknown how long a particular tote will remain on the conveyor and therefore unavailable for order fulfillment processes. These and other factors may contribute to under-utilized storage volume in partially filled totes and/or compartments, starvation at downstream processes, and potentially inefficient labor usage as operator may be required to perform additional tasks before they can place an item in a tote.

SUMMARY OF THE INVENTION

The present invention provides an automated warehouse system and method for storage of inventory items in compartmentalized receptacles. The system includes decant workstations with multiple decant positions with each decant position preferably dedicated to receiving and presenting totes having one particular compartment configuration that is different than the compartment configuration of the totes received at the other decant positions. The method includes presenting a decant operator (e.g. human or robot) with multiple totes, preferably including one of each of the tote compartment configurations. In this manner, the decant operator should have an empty or partially filled compartment of each available compartment size available to decant to at all times. A warehouse control system (WCS) guides the operator's decant operations, including guiding the operator to a particular compartment of a particular tote in which to place the inbound items. Once a tote's compartments are each filled to capacity, that tote is returned to the storage system and replaced with another tote having an identical compartment configuration. The system may include buffers adjacent the decant positions to reduce cycle times when a tote is returned to the ASRS and replaced by another tote. The system and method may be utilized with various forms of automated storage and retrieval system (ASRS) technology for storage of compartmentalized receptacles or totes. This includes removing partially filled totes from storage in the ASRS to a decant position of a decant workstation for further filling, and returning the tote back to storage in the ASRS. The system and method are particularly well-suited for grid-based or cube storage arrays and automated guided vehicle (AGV) or autonomous mobile robot (AMR) based material handling systems. It is contemplated that the system and method may be utilized with aisle-based ASRS as well as full case or "miniload" ASRS. The system may include additional functionalities, including decant operator tracking functions.

In one form of the present invention, the automated warehouse system includes the WCS and an automated storage and retrieval system (ASRS) for storing a plurality of inventory storage receptacles or totes at an array of storage locations in the ASRS. The totes each include one of multiple different compartment configurations or layouts with each compartment of the layouts configured to receive inventory items up to a particular size and/or of a particular shape. For example, a first compartment configuration may include a single storage compartment defined as the entire storage volume of the tote and a second compartment configuration includes at least two storage compartments defining uniform portions of the storage volume of the tote.

The system also includes a storage and retrieval operator configured to store and retrieve inventory receptacles in the ASRS, such as a grid robot or a shuttle, for example. A decant workstation is connected to the ASRS and includes two or more decant positions. The decant positions are each provided for receiving different tote types (i.e. tote with different compartment configurations). Preferably, the decant workstation includes one decant position for each tote type/compartment configuration utilized in the system.

In one aspect, one or more dedicated transportation systems are provided for transporting the totes between the ASRS and their corresponding decant positions. In other words, a dedicated transportation system is provided for transporting a tote with a particular compartment configuration to the corresponding decant position.

In another aspect, the ASRS is provided in the form of a grid-based storage system and the decant workstation is positioned alongside the ASRS and the transportation system comprises transfer portals or access ports formed in a side wall of the ASRS. A transfer mechanism is provide at each access port to move a tote through the opening of the respective access port between an interior of the ASRS and the corresponding decant position.

In yet another aspect, the ASRS is provided in the form of an aisle-based storage system and the transportation system comprises one or more conveyors to move or transfer totes from the ASRS to corresponding decant positions. The conveyors may include one or more right angle transfers (RATs) to transfer totes from the respective conveyor to the corresponding decant position.

In another aspect, the WCS is operable to direct inventory receptacles having empty compartments from the ASRS to the appropriate decant workstation to be filled with inbound inventory that requires the corresponding empty compartment size. The WCS is operable to monitor a pending order list of orders to be fulfilled within the warehouse facility. Based on the pending order list, the WCS only selects totes with empty compartments to send to the decant workstation as long as they will not be required for an in-progress order or an order that will be fulfilled within a user-defined period. In other words, the WCS selects only non-required totes with empty compartments to send to the decant workstation such that required totes remain available for order fulfillment operations.

In another form of the present invention, a method is provided for decanting inbound inventory into optimally dimensioned compartments of inventory receptacles in an automated warehouse facility having a WCS and an ASRS. The method includes presenting a first type or format of tote at a first decant position of a decant workstation. The first format of tote includes a first compartment configuration. The method also includes presenting at least one additional type or format of tote at at least one additional decant position of the decant workstation. The additional format of totes includes a compartment configuration that is different from that of the first format of tote. A decant operator (e.g. human or robot) at the decant workstation retrieves an item from an inbound inventory unit load or vendor case of items, and may scan the item so the WCS may identify the retrieved item. The WCS directs the decant operator to place the retrieved item in an optimally dimensioned compartment in one the tote formats at one of the decant positions based on the identity of the retrieved item. The WCS monitors each of the totes at the decant positions to determine if each of the compartments in one of the totes are filled to capacity. If each compartment in a particular tote at a decant position are filled, that tote is transported from its decant position to the ASRS. Otherwise the tote remains at its decant position to receive additional inbound inventory items corresponding in size to the compartments of that inventory receptacle.

In one aspect, the method may include the WCS directing or sending totes with empty compartments from the ASRS to the decant workstation to be filled with inbound inventory.

Preferably, the WCS only selects non-required totes with empty compartments. A non-required tote may be defined as a tote having inventory item which are not required for an in-progress order or an order to be fulfilled within a user-defined period (e.g. within the ensuing twenty minute period). The method may include buffering one of each tote format adjacent the corresponding decant position. Accordingly, once a tote at one of the decant positions has been filled and transported to the ASRS the buffered tote is immediately available to move to the open decant position.

Accordingly, the system and method provide for decanting inbound items to partially filled tote compartments without the need to reconfigure or rearrange dividers within the totes. In a preferred embodiment, each of the tote formats/compartment configurations are presented at the decant workstation at substantially all times. As such, the decant operator should always have a compartment available to place any type of item that is retrieved form the inbound loud without rearranging tote dividers. The system and method permit efficient space usage as totes are not required to be fully depleted prior to receiving additional inventory items. Additionally, the system and method may substantially reduce or eliminate the necessity for tote consolidation in order to free up tote storage space.

These and other objects, advantages, purposes, and features of this invention will become apparent upon review of the following specification in conjunction with the drawings.

DESCRIPTION OF THE PREFERRED EMBODIMENTS

Figure 1:
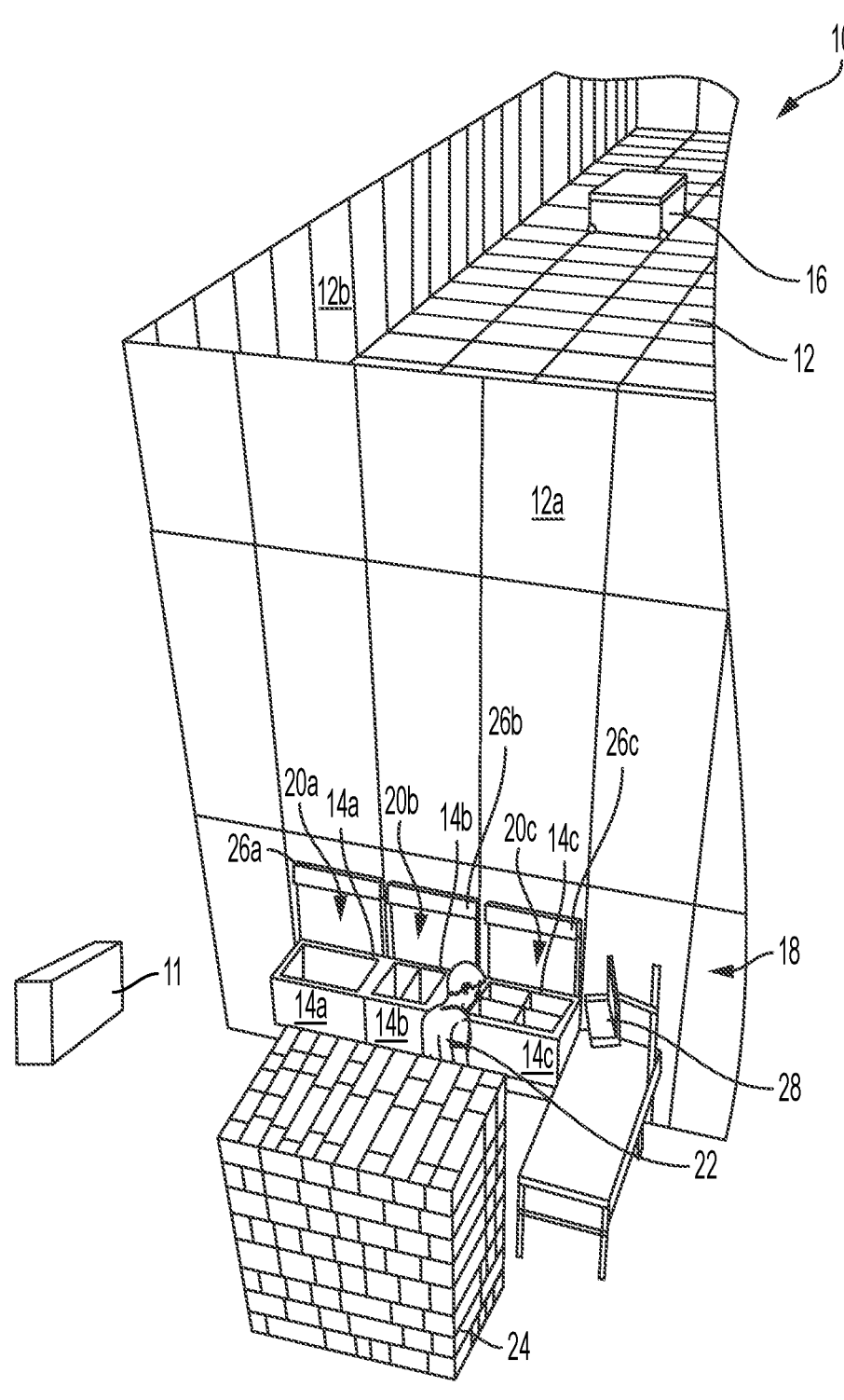
FIG. 1 is a top-side perspective view of a portion of an exemplary grid-based decant system for a warehouse facility, in accordance with aspects of the present invention.

Referring now to the drawings and the illustrative embodiments depicted therein, an automated warehouse system 10 and a method 100 are provided for decanting and storage of inventory items in compartmentalized receptacles within a warehouse, installation, or order fulfillment facility, such as a micro-fulfillment center (MFC), for example (FIGS. 1-7). The warehouse system includes a warehouse control system (WCS) 11, such as a server based computer control system, and an automated storage and retrieval system (ASRS), in the form of a grid-based or cube storage system 12, defining storage locations for storing inventory storage receptacles or totes (FIG. 1). The totes are compartmentalized with one of multiple possible compartment configurations in which each compartment is configured to store or contain one or more inventory item. In the illustrated embodiment, the tote compartment configurations include: a single-zone tote 14a in which a single compartment is defined by an entirety of the interior storage volume of the tote 14a; a dual-zone tote 14b in which two compartments are defined by about one-half of the interior storage volume of the tote 14b; and a four-zone tote 14c in which four compartments are defined by about one-quarter of the interior storage volume of the tote 14c (FIGS. 1-5). The ASRS 12 includes a storage and retrieval operator, in the form of a grid robot 16, to store and retrieve totes at the storage locations of the ASRS 12 (FIG. 1), where such ASRS may be supplied, for example, by Autostore Technology AS of Norway. While the illustrative embodiment is depicted and described as utilizing three tote compartment configurations 14a, 14b, and 14c, it will be appreciated that fewer or more compartment configurations may be utilized within a warehouse facility without substantially affecting the benefits and functions of the present invention. It will also be appreciated that while the ASRS 12 of the illustrative embodiment of FIGS. 1-5 is depicted as a grid-based storage system, the system and method may be adapted for use with various formats of automated storage and retrieval systems, such as an aisle-based storage system 202 as described in further detail below, a mini-load storage system, or a robotic vehicle based material handling system, such as an automated guided vehicle (AGV) or autonomous mobile robot (AMR), for example.

Figure 2:
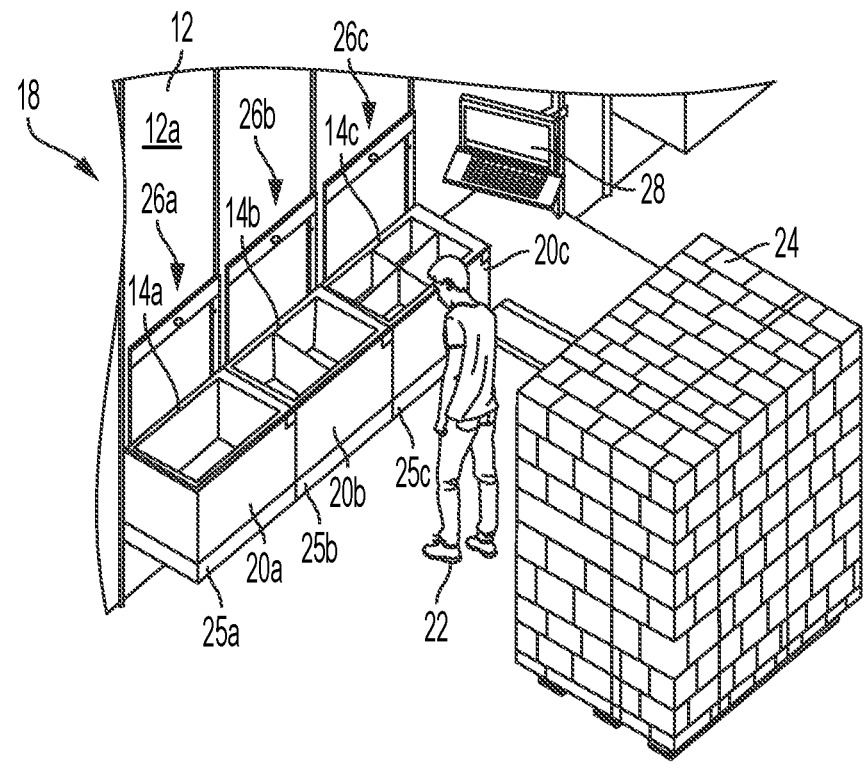
FIG. 2 is a left-front perspective view of an exemplary decant workstation of the decant system of FIG. 1, the exemplary decant workstation depicted having a plurality of wide, grid access ports.
Figure 3:
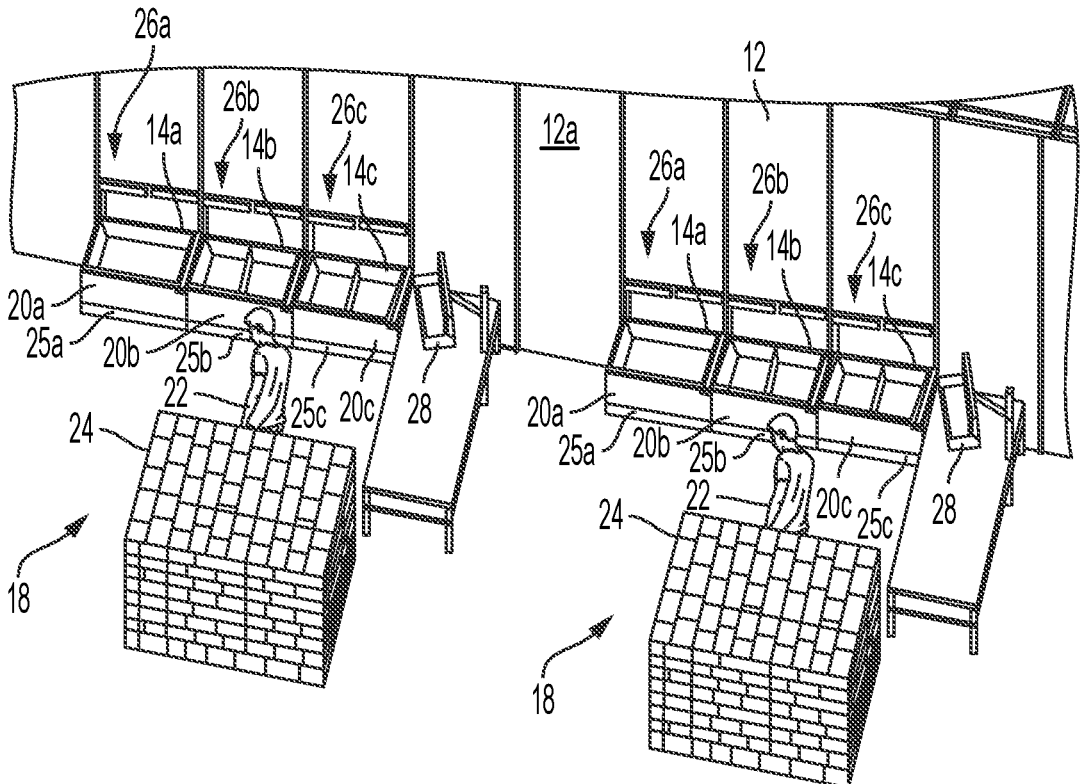
FIG. 3 is a top-side perspective view of a portion of the decant system of FIG. 1, depicting a plurality of decant workstations of FIG. 2 shown adjacent one another.
Figure 4:
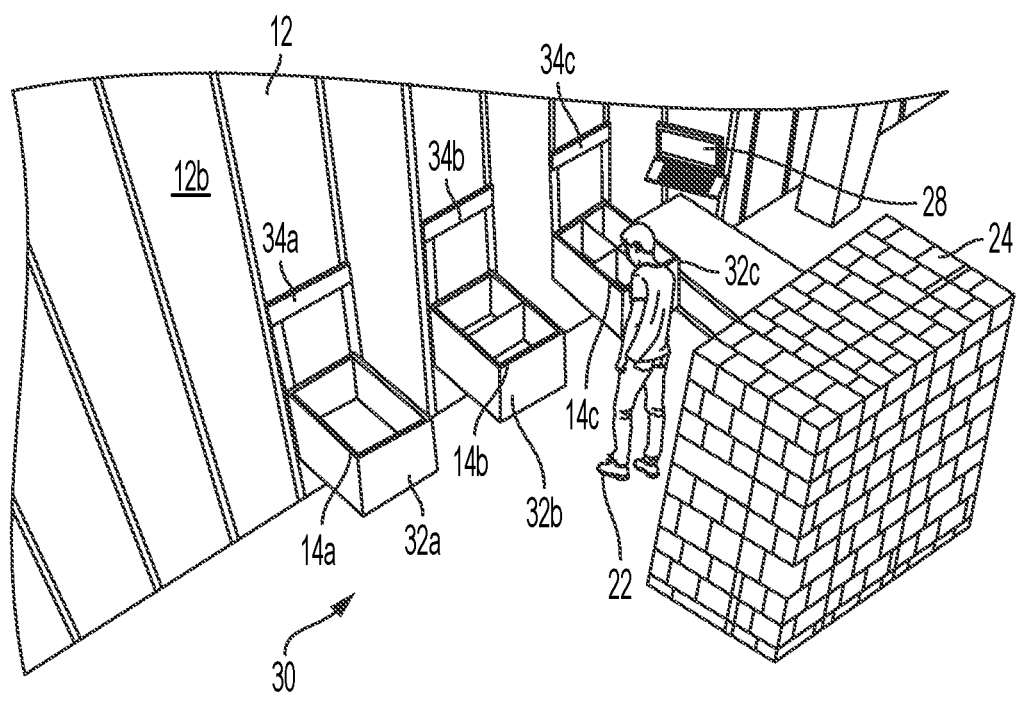
FIG. 4 is a left-front perspective view of another exemplary decant workstation of the decant system of FIG. 1 in accordance with aspects of the present invention, with the exemplary decant workstation depicted having a plurality of narrow, grid access ports.
Figure 5:
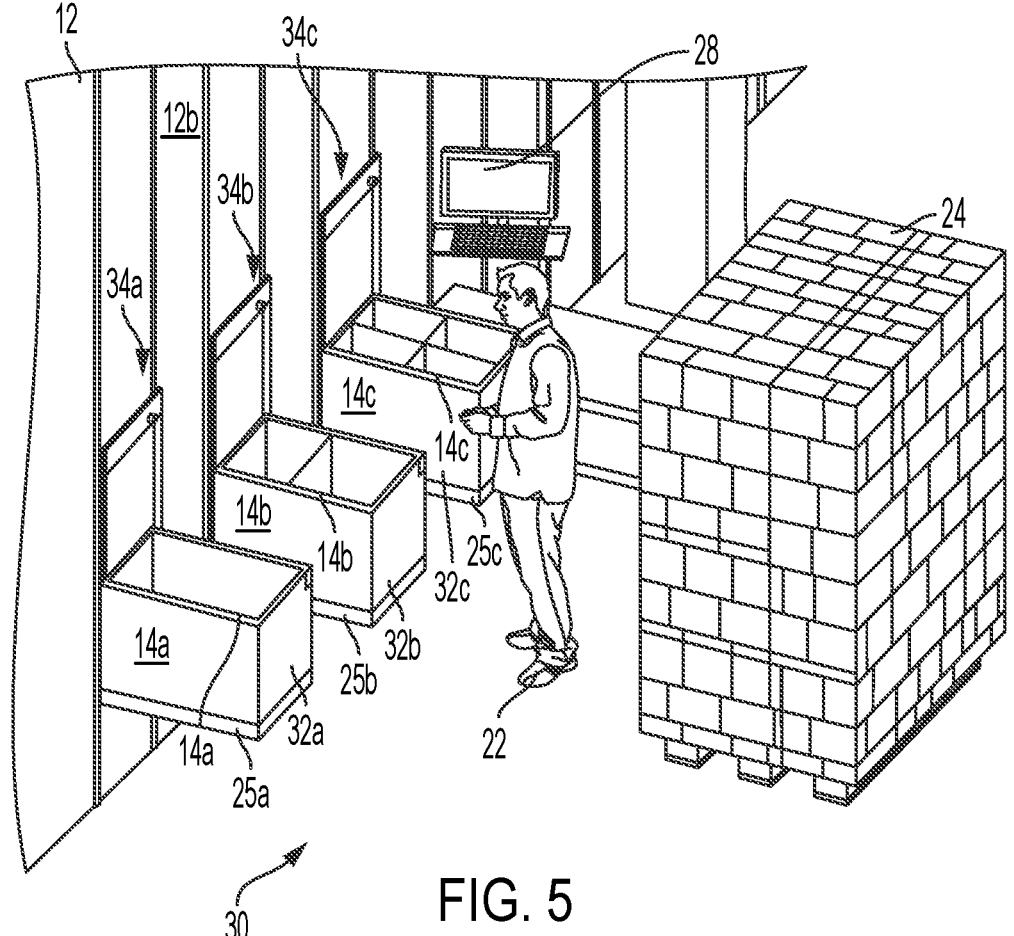
FIG. 5 is a further left-front perspective view of the exemplary decant workstation of FIG. 4.

A decant workstation 18 is provided adjacent the ASRS 12 and includes transfer or decant positions 20a, 20b, and 20c, each preferably provided for receiving and presenting only one particular type of tote based on the compartment configuration of the tote (FIGS. 1-3). For example, in the illustrated embodiment of FIGS. 1-3, the first decant position 20a receives single-zone totes 14a, the second decant position 20b receives dual-zone totes 14b, and the third decant position 20c receives four-zone totes 14c. The decant positions 20a, 20b, and 20c are each accessible to a decant operator 22 such that the decant operator 22 may decant inbound inventory, such as from a unit load or pallet of inbound goods 24, into optimally dimensioned compartments within the totes 14a, 14b, and 14c, as directed by the WCS 11. While the decant operator 22 in the illustrative embodiments is depicted as a human operator, it will be appreciated that the decant operator 22 may be an automated operator, such as a robot manipulator, for example. While the illustrative embodiment is depicted and described as having three decant positions 20a, 20b, and 20c, it will be appreciated that fewer or more decant positions may be provided at the decant workstation without substantially affecting the benefits and functions of the present invention. For example, the number of decant positions may correspond to the number of tote types/compartment configurations utilized in the warehouse facility. It is contemplated that it may be beneficial in some embodiments to utilize a particular decant position to receive two or more different tote types with different compartment configurations. For example, in a relatively low volume installation or setting, the decant workstation may include two decant positions while the facility utilizes four different tote types/compartment configurations. In such an example, one of the two decant positions may only receive two of the tote types and the other of the two decant positions may only receive the other two of the tote types. While the exemplary totes 14a, 14b, and 14c are depicted as each having compartment configuration with each corresponding compartment having a generally uniform storage volume, it is contemplated that the compartment configuration may be non-uniform. For example, a compartment configuration may include one compartment defining about one-half of the interior storage volume of the tote and two compartments defining about one-quarter of the interior storage volume of the tote.

System 10 further comprises a transportation or conveyance system 23 for moving totes between the ASRS 12 and the decant positions at the decant workstations, where the transportation system may comprise multiple independent systems. In the illustrated embodiment the transportation system is provided for transporting the single-zone totes 14a between the ASRS 12 and the first decant position 20a, and comprises a first transfer portal or access port 26a and a first transfer mechanism comprising a first conveyor 25a (FIGS. 1-3). The conveyor 25a of the transfer mechanism may be configured to provide sufficient space to receive two or more totes from the grid robot 16 at any given time. The conveyor 25a is operable to transport the totes 14a back and forth through the access port 26a, and the conveyor 25a may provide a buffering function, such as described in further detail below. Likewise, the transportation system is provided for transporting the dual-zone totes 14b between the ASRS 12 and the second decant position 20b, in the form of a second transfer portal or access port 26b and a second transfer mechanism comprising a second conveyor 25b. The transportation system is likewise provided for transporting the quad-zone totes 14c between the ASRS 12 and the third decant position 20c, in the form of a third transfer portal or access port 26c and a third transfer mechanism comprising a third conveyor 25c.

Figure 6:
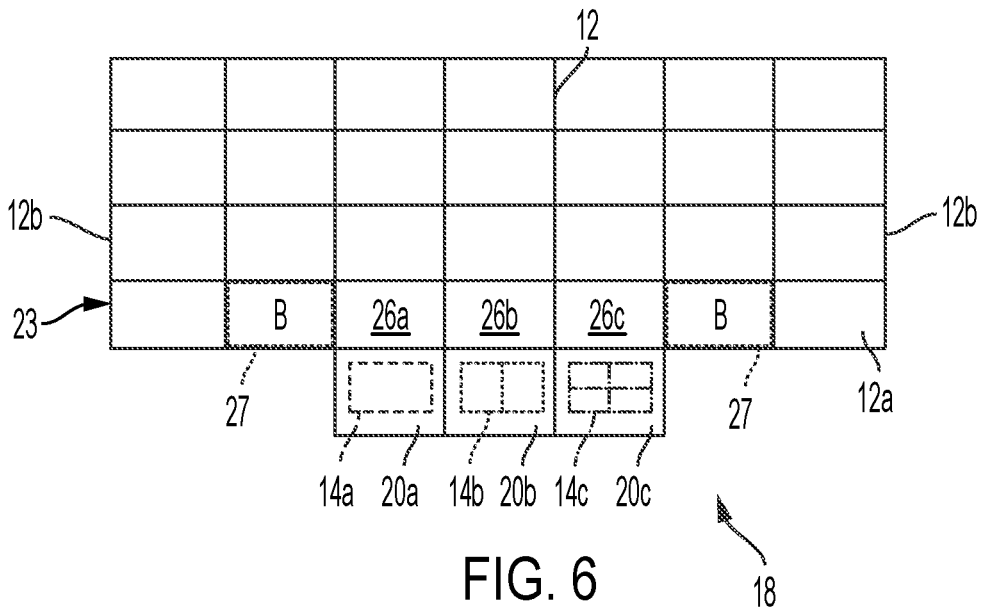
FIG. 6 is a schematic plan diagram of a portion of a grid storage array adjacent a decant workstation of the decant system of FIG. 1, depicting an exemplary grid column assignment adjacent the decant workstation.

The portals 26a, 26b, and 26c, are formed in a side wall of the ASRS 12, such as in a similar manner as that known in commonly utilized grid-based storage systems, for example. Each portal 26a, 26b, and 26c includes a transfer mechanism, such as conveyors 25a, 25b, 25c, to move a tote through the corresponding opening in the ASRS side wall and present the corresponding tote 14a, 14b, or 14c at its decant position. With reference to FIG. 6, the transportation system may further comprise internal conveyor or other such tote transfer mechanisms. For example, additional totes 14a, 14b, and/or 14c may be buffered at buffer positions 27 that are adjacent the access ports 26a, 26b, and/or 26c and which are accessible by the grid robot 16. As such, once the previous tote 14a, 14, b, or 14c at a corresponding decant position 20a, 20b, or 20c has been filled and transported to the ASRS 12 via the transfer mechanism, the buffered tote may be transferred to the appropriate access port 26a, 26b, or 26c and transferred via the transfer mechanism to the corresponding decant position 20a, 20b, or 20c. Optionally, the grid robot 16 may hold or buffer a particular tote in the event that a tote at a particular decant position is about to be filled and transferred to the ASRS 12. Once the previous tote is transferred to the ASRS 12, the grid robot 16 may transport the buffered tote directly to the appropriate one the access ports 26a, 26b, or 26c (e.g. bypassing the buffer positions 27). Likewise, conveyors 25a, 25b, 25c may comprise portions internal to ASRS 12 and may include right angle transfers (RATs) for moving and exchanging totes 14a, 14b, 14c within ASRS 12.

The WCS 11 is operable to control storage and retrieval operations within the system 10 for transporting the totes 14a, 14b, and 14c between the ASRS 12 and the corresponding decant positions 20a, 20b, and 20c of the decant workstation 18. The WCS 11 is operable to direct the decanting operations at the decant workstation 18 to guide the decant operator 22 to pick each inbound item from the pallet 24 and place it into an optimally dimensioned compartment of one of the totes as a function of the storage requirements of the particular picked item (e.g. dimensions of the item). The WCS 11 and system 10 include a user-interface 28 at the decant workstation 18 to guide the operator 22 (FIGS. 1-3). The WCS 11 is operable to direct the ASRS 12 to retrieve and transfer totes having empty compartments from the ASRS 12 to the appropriate decant workstation 20a, 20b, or 20c so that the empty compartments may be filled with inbound inventory for storage in the ASRS. The WCS 11 is operable to monitor a pending order list of orders to be fulfilled within the warehouse facility to determine whether inventory items within a tote stored in the ASRS 12 will be required for an in-progress order or an order that will be fulfilled within a user-defined period. In this manner, the WCS 11 may selectively call for the retrieval and transport of totes with empty compartments to the decant workstation 18 in which the retrieved totes are not required for an in-progress order or an order that will be fulfilled within a user-defined period. In other words, the WCS 11 ensures that required items already in the ASRS 12 are readily retrievable when necessary to fulfil the corresponding order. Thus, totes within the ASRS 12 that are required for an in-progress order or totes that will be imminently required for an upcoming order (e.g. to be fulfilled or activated within the following one-half hour) are not sent to the decant workstation 18.

Due to the nature of the grid-based ASRS 12, the orientation of the totes is typically maintained as they are stored and transported within the ASRS 12, where the totes can be configured to be rectangular such that they are longer than they are wide. Accordingly, ASRS 12 can be configured with differing sized portals. For example, the portals 26a, 26b, and 26c are provided at a long-side wall 12a of the ASRS 12 and have openings dimensioned to receive the long or wide dimension of the totes 14a, 14b, and 14c. That is, side 12a is a side of ASRS 12 to which a long side of the totes 14a, 14b, 14c are parallel. Decant workstation 18 may be referred to as a long-side or wide decant workstation and portals 26a, 26b, and 26c may be referred to as "wide" transfer portals or access ports. As depicted in the illustrative embodiments of FIGS. 4 and 5, other, short-side or narrow decant workstations 30 are provided for the short-side walls 12b of the grid-based ASRS 12. That is, side 12b is a side of ASRS 12 to which a short side of the totes 14a, 14b, 14c are parallel. Decant workstations 30 include first, second, and third decant positions 32a, 32b, and 32c, respectively. "Narrow" transfer portals or access ports 34a, 34b, and 34c are provided with decant workstations 30 and have openings dimensioned to correspond with or receive the short or narrow dimension of the totes 14a, 14b, and 14c. Provision of long-side decant workstations 18 and short-side decant workstations 30 enable totes 14a, 14b, 14c to be readily removed from and returned to ASRS 12 at the associated ports.

Figure 7:
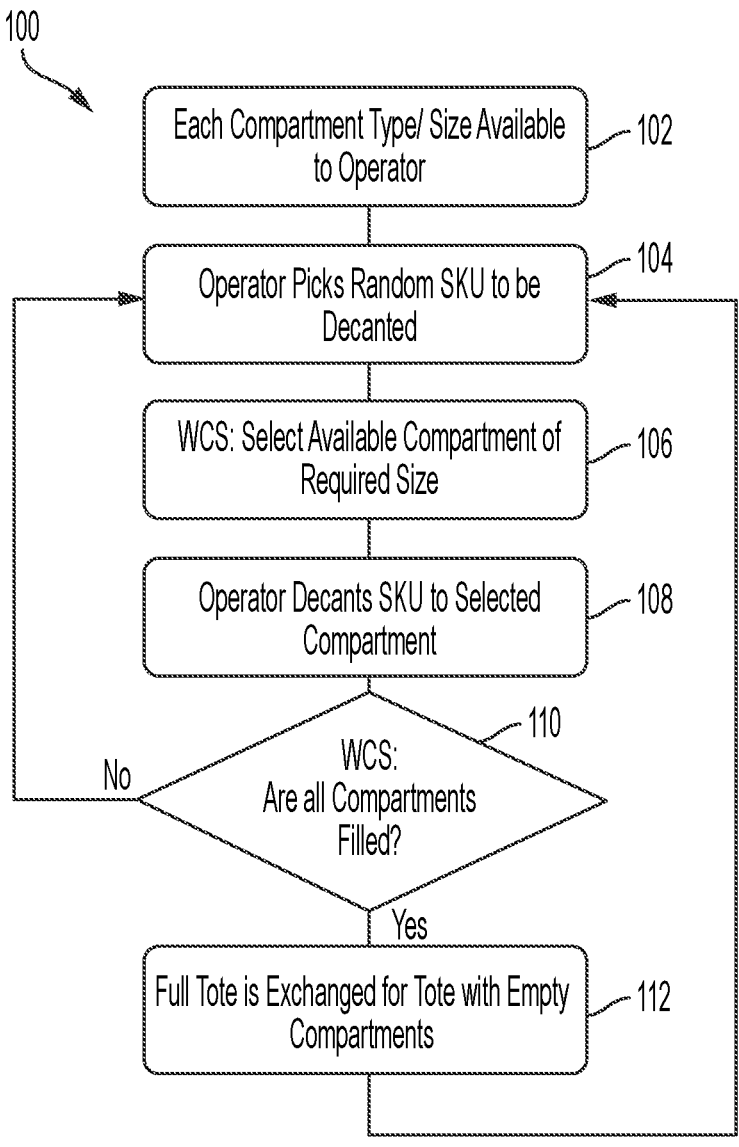
FIG. 7 is a diagram of a method for decanting items to compartmentalized storage receptacles within a warehouse facility in accordance with aspects of the present invention.
Figure 8:
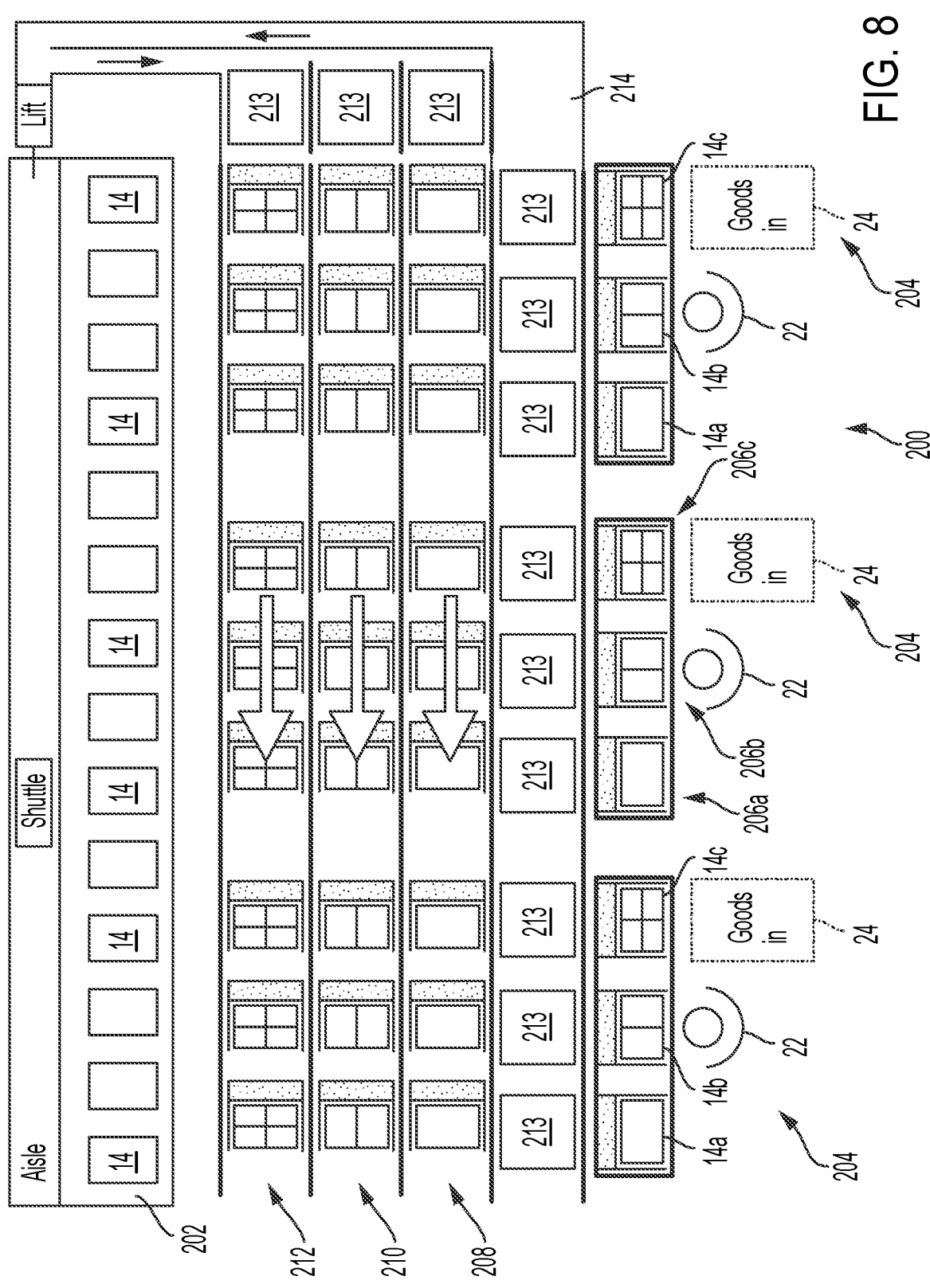
FIG. 8 is a schematic diagram of an exemplary conveyor-based decant system for a warehouse facility, in accordance with aspects of the present invention.

Referring now to the illustrative embodiment of FIG. 7, a method 100 is provided for decanting inbound inventory into optimally or sufficiently dimensioned compartments of inventory receptacles or totes in an automated warehouse facility, such as a facility with an automated warehouse system 10 as described above and illustrated in FIGS. 1-6 or the automated warehouse system 200 described in further detail below and illustrated in FIG. 8. The following will be described in reference to exemplary warehouse system 10, the exemplary long-side decant workstations 18, and their components and functions as described above. The method 100 includes presenting 102 a first tote type 14a, having a single-zone compartment configuration, at a first decant position 20a of a decant workstation 18, a second tote type 14b having a dual-zone compartment configuration, at a second decant position 20b, and a third tote type 14c having a four-zone compartment configuration, at a third decant position 20c (FIGS. 1-3 and 7). The totes 14a, 14b, and 14c at the respective decant positions 20a, 20b, and 20c, each preferably having an empty compartment or at least-partially empty compartment available to receive inbound inventory items.

A decant operator 22 at the decant workstation 18 retrieves 104 an item from an inbound inventory load 24 and may scan the picked item or the system may include optical devices or other passive scanning systems to determine the item which the operator 22 picked. Based on the item picked, the WCS 11 determines 106 what size compartment is required to optimally receive the picked item and determines which of the presented totes 14a, 14b, and 14c includes the optimally dimensioned compartment and the relative position of that compartment based on the orientation of the tote at the decant position 20a, 20b, or 20c. The WCS 11 then directs the decant operator 22 to place 108 the retrieved item in the optimally dimensioned compartment. It is contemplated that in some instances the decant operator 22, instead of the WCS 11, may determine or select the optimally dimensioned compartment for a particular item. The system 10 may track the operations of the decant operator 22, including picking from the inventory load 24 and placement of items in the directed tote compartments. Tracking the decant operator 22 may be performed in similar fashion to the operator tracker system and methods disclosed in commonly owned and assigned U.S. patent application Ser. No. 17/541,775, filed Dec. 3, 2021 by Dematic Corp. of Grand Rapids, MI and entitled ORDER FULFILLMENT OPERATOR TRACKER, the disclosure of which is hereby incorporated herein by reference in its entirety.

The WCS 11 monitors 110 each of the totes 14a, 14b, and 14c at the decant positions 20a, 20b, and 20c, such as to determine the fill rate per compartment and/or to determine if each of the compartments in one of the respective totes is filled, for example. The WCS 11 may monitor partially filled compartments to determine if they have additional storage volume available for additional decanted items. If all of the compartments in one of the respective totes 14a, 14b, or 14c at the decant positions 20a, 20b, or 20c is filled to capacity, that tote is exchanged 112 by the transportation system 23 so as to be transported from its respective decant position to the ASRS 12 via the transfer mechanism at the corresponding access port 26a, 26b, or 26c and then stored at an assigned storage location within the ASRS 12 via the grid robot 16 (FIGS. 1 and 7). Once the tote is transferred out of the decant position, another tote from the ASRS 12 with empty compartments is transferred into the decant position for presentation to the decant operator 22. However, if one of the compartments in one of the respective totes 14a, 14b, or 14c at the decant positions 20a, 20b, or 20c is not filled to capacity (i.e. has adequate storage volume to receive additional inbound items), that tote is held at its decant position to receive additional inbound inventory items at 104, 106, and 108 corresponding in size to the remaining empty compartments of that tote. Preferably, the method 100 includes the WCS 11 monitoring a pending order list of orders to be fulfilled within the warehouse facility and determining whether items within totes stored in the ASRS 12 will be required for an in-progress order or an order that will be fulfilled within a user-defined period (e.g. the following one-half hour of facility operation). The WCS 11 then only selects totes with non-required items and empty compartments to be transported to the decant workstation 18 to receive inbound inventory items the tote's empty compartments. In this manner, the WCS 11 ensures that there is substantially no disruption to downstream order fulfilment operations while maximizing the storage volume available within the ASRS 12. In other words, the WCS 11 prioritizes order fulfillment operations over decant/storage volume optimization to ensure that downstream processes are not starved of required items to fulfil orders. It is contemplated that there may typically be ample totes within the ASRS 12 which have empty compartments which can be decant to and which are not required for in-progress or orders to be activate within the user-defined period.

The method may include buffering one of each type of tote 14a, 14b, and 14c adjacent their corresponding access ports 26a, 26b, and 26c such that once the tote at the corresponding decant position 20a, 20b, or 20c has been filled and transported to the ASRS 12, the respective buffered tote is immediately available to move to the access port and to the corresponding decant position. Additional totes 14a, 14b, and/or 14c may be buffered at buffer positions 27 that are adjacent the access ports 26a, 26b, and/or 26c and which are accessible by the grid robot 16 (FIGS. 1 and 6). For example, the WCS 11 and system 10 may buffer a dual-zone tote 14b adjacent the second access port 26b. Once the tote 14b at the second decant position 20b has been filled and transported to the ASRS 12, the buffered tote 14b is transferred to the second access port 26b and transferred via the transfer mechanism to the second decant position 20b. Optionally, the grid robot 16 may hold or buffer a particular tote in the event that a tote at a particular decant position is about to be filled and transferred to the ASRS 12. Once the previous tote is transferred to the ASRS 12, the grid robot 16 may transport the buffered tote directly to the appropriate one the access ports 26a, 26b, or 26c (e.g. bypassing the buffer positions 27).

Referring now to the illustrative embodiment of FIG. 8, an automated warehouse system 200 is provided for a warehouse facility and functions in similar fashion to system 10 described above, and includes many identical or substantially similar components as system 10, with significant differences discussed hereinafter. Automated warehouse system 200 includes an ASRS in the form of an aisle-based storage system 202, as compared to the grid-based storage system 12 of system 10 as described above. System 200 includes decant workstations 204 similar or substantially identical to the decant workstations 18 of system 10, each having a first decant position 206a, second decant position 206b, and third decant position 206c, each providing for receiving corresponding ones of the totes 14a, 14b, and 14c, respectively. The system 200 includes a first transportation system having a first conveyor 208 to move single-zone totes 14a from the ASRS 202 to the first decant position 206a, a second transportation system having a first conveyor 210 to move dual-zone totes 14b from the ASRS 202 to the second decant position 206b, and a third transportation system having a third conveyor 212 to move four-zone totes 14c from the ASRS 202 to the third decant position 206c (FIG. 8).

The conveyors 208, 210, and 212 may include one or more right angle transfers (RATs) 213 to transfer totes from the respective conveyor to the corresponding decant positions. The system 200 includes a return conveyor 214 between the decant workstations 204 and the ASRS 202 for transporting totes 14a, 14b, and/or 14c from a respective one of the decant positions 206a, 206b, and 206c to the ASRS 202 for storage until they are required for order fulfilment operations. The decant positions 206a, 206b, and 206c may include transfer mechanisms, such as in the form of RATs 213, to move filled totes to the return conveyor 214. The conveyors 208, 210, and 212 may be operable to buffer totes adjacent corresponding decant positions 206a, 206b, and 206c of each of the decant workstations 204 such that once a tote at a particular decant position has been filled and transported to the ASRS 202, the buffered tote is immediately available to move to the appropriate decant position.

Figure 9:
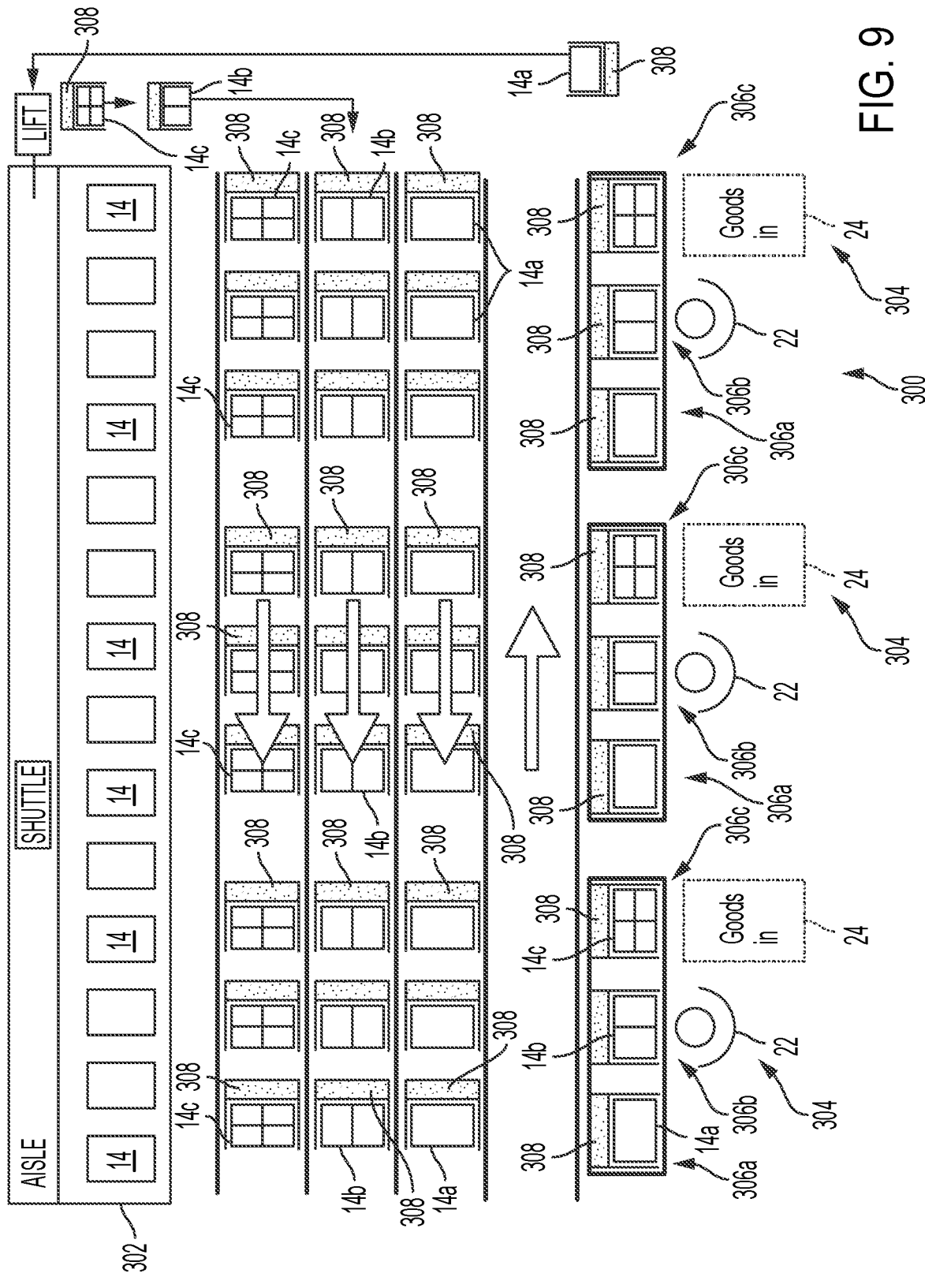
FIG. 9 is a schematic diagram of an exemplary robotic vehicle based decant system for a warehouse facility, in accordance with aspects of the present invention.

Referring now to the illustrative embodiment of FIG. 9, an automated warehouse system 300 is provided for a warehouse facility and functions in similar fashion to systems 10 and 210 described above, and includes many identical or substantially similar components as systems 10 and 210, with significant differences discussed hereinafter. Automated warehouse system 300 includes an ASRS in the form of an aisle-based storage system 302, as compared to the grid-based storage system 12 of system 10 as described above. System 300 includes decant workstations 304 similar or substantially identical to the decant workstations 18 of system 10, each having a first decant position 306a, second decant position 306b, and third decant position 306c, each providing for receiving corresponding ones of the totes 14a, 14b, and 14c, respectively. The system 300 includes a transportation system, in the form of AMRs 308, to move totes (i.e. single-zone totes 14a, dual-zone totes 14b, and four-zone totes 14c) from the ASRS 302 to their respective ones of the first decant position 306a, second decant position 306b, and third decant position 306c (FIG. 9). As illustrated in FIG. 9, the AMRs 302 are operable to buffer totes adjacent corresponding decant positions 306a, 306b, and 306c of each of the decant workstations 304 such that once a tote at a particular decant position has been filled and transported to the ASRS 302, a buffered tote is immediately available to move to the appropriate decant position. The AMRs 308 may provide support for the respective totes at the decant positions, i.e. the AMRs 308 present the totes to the decant operator 22 at the decant workstations 304.

Thus, the system and method of the illustrative embodiments of the present invention provide for optimized decanting of inbound inventory into partially filled inventory totes having empty or partially filled compartments. The system and method do not require a tote to be completely emptied of goods and/or require an operator to reconfigure or rearrange compartment dividers to accommodate a product that is not optimized to one of the already provided compartments in a tote. The system utilizes decant workstations with multiple decant positions and each decant position is provided for receiving only totes with a particular compartment configuration. Preferably, the decant operator is continuously presented with at least one empty compartment of each available compartment size utilized in the facility.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. An automated warehouse system for storage of items in compartmentalized inventory receptacles, said warehouse system comprising:

a warehouse control system;

an automated storage and retrieval system (ASRS) for storing a plurality of inventory storage receptacles and comprising a plurality of storage locations each configured to store one of said plurality of inventory receptacles, wherein each of said plurality of inventory receptacles comprises one chosen from at least two different compartment configurations, wherein each compartment of the compartment configurations is configured to receive inventory items;

a storage and retrieval operator configured to store and retrieve inventory receptacles at said plurality of storage locations; and a decant workstation in transport communication with said ASRS, said decant workstation comprising:

a first decant position for receiving ones of the inventory receptacles having a first compartment configuration chosen from said at least two different compartment configurations from said ASRS; and a second decant position for receiving ones of the inventory receptacles having a second compartment configuration chosen from said at least two different compartment configurations from said ASRS;

said first decant position and said second decant position accessible to a decant operator for decanting inbound inventory into respective compartments of the receptacles at said first and second decant positions;

wherein said warehouse control system is configured to control storage and retrieval operations within said warehouse system for transporting the inventory receptacles between said ASRS and said first and second decant positions of said decant workstation, and wherein the inventory receptacles having the first compartment configuration are not received at the second decant position and the inventory receptacles having the second compartment configuration are not received at the first decant position; and said warehouse control system configured to direct decanting operations at said decant workstation such that the decant operator decants each inbound item into an optimally dimensioned compartment of one of the inventory receptacles.

2. The warehouse system of claim 1, further comprising a transportation system for transporting the inventory receptacles having said first compartment configuration between said ASRS and said first decant position and for transporting the inventory receptacles having said second compartment configuration between said ASRS and said second decant position.

3. The warehouse system of claim 2, wherein said ASRS comprises a grid-based storage system and said decant workstation is positioned at said ASRS, wherein said transportation system comprises a first access port formed in a side wall of said ASRS and a first transfer mechanism to move an inventory receptacle through said first access port between an interior of said ASRS and said first decant position, and comprises a second access port formed in a side wall of said ASRS and a second transfer mechanism to move an inventory receptacle through said second access port between an interior of said ASRS and said second decant position.

4. The warehouse system of claim 2, wherein said ASRS comprises an aisle-based storage system, said transportation system comprises a first conveyor to move inventory receptacles from said ASRS to said first decant position, and said transportation system comprises a second conveyor to move inventory receptacles from said ASRS to said second decant position.

5. The warehouse system of claim 4, wherein each of said first conveyor and said second conveyor comprises a right angle transfer to transfer inventory receptacles from the respective conveyor to the corresponding decant position.

6. The warehouse system of claim 2, wherein said ASRS comprises an aisle-based storage system, said transportation system comprises at least one automated guided vehicle (AGV) or autonomous mobile robot (AMR) configured to move inventory receptacles from said ASRS to said first decant position, and to move inventory receptacles from said ASRS to said second decant position.

7. The warehouse system of claim 2, wherein said warehouse control system directs inventory receptacles having empty compartments therein from said ASRS to said decant workstation to be filled with inbound inventory requiring the corresponding empty compartments for storage in the ASRS.

8. The warehouse system of claim 7, wherein said warehouse control system monitors a pending order list of orders to be fulfilled within a warehouse facility having said warehouse system to determine whether inventory items within an inventory receptacle stored in the ASRS will be required for an in-progress order or an order that will be fulfilled within a user-defined period, said warehouse control system selects only non-required inventory receptacles with empty compartments, wherein a non-required inventory receptacle is defined as an inventory receptacle that is not required for an in-progress order or an order to be fulfilled within the user-defined period.

9. The warehouse system of claim 1, wherein at least one of said first compartment configuration and said second compartment configuration comprises a plurality of storage compartments.

10. The warehouse system of claim 1, wherein each of said plurality of inventory receptacles comprises one chosen from at least three different compartment configurations, and further comprising a third decant position for receiving ones of the inventory receptacles from said ASRS having a third compartment configuration chosen from said at least three different compartment configurations, and wherein at least two of said first compartment configuration, said second compartment configuration and said third compartment configuration comprise a plurality of storage compartments.

11. A method for decanting inbound inventory into optimally dimensioned compartments of inventory receptacles in an automated warehouse facility having a warehouse control system and configured for storing inventory items in a plurality of inventory receptacles within an automated storage and retrieval system (ASRS), said method comprising:

delivering a first type of inventory receptacle of the plurality of inventory receptacles from the ASRS to a first decant position of a decant workstation of the automated warehouse facility, each of the first type of inventory receptacles having a first compartment configuration;

delivering a second type of inventory receptacle of the plurality of inventory receptacles from the ASRS to a second decant position of the decant workstation, each of the second type of inventory receptacles having a second compartment configuration that is different than the first compartment configuration;

retrieving by a decant operator at the decant workstation an item from an inbound inventory load;

directing by the warehouse control system the decant operator to place the retrieved item in an optimally dimensioned compartment in one selected from either of the first type or second type of inventory receptacle at the first and second decant positions based on the particular item retrieved by the decant operator;

placing by the decant operator the particular item in the selected compartment;

the warehouse control system monitoring each of the inventory receptacles at the first and second decant positions to determine if each of the compartments in the respective inventory receptacles is filled;

wherein if all of the compartments in a respective inventory receptacle at one of the decant positions is filled, that inventory receptacle is transported from its decant position to the ASRS;

wherein if one of the compartments in a respective inventory receptacle at one of the decant positions is not filled, that inventory receptacle is held at its decant position to receive additional inbound inventory items corresponding in size to the compartments of that inventory receptacle; and wherein the first type of inventory receptacle is not delivered to the second decant position and the second type of inventory receptacle is not delivered to the first decant position.

12. The method of claim 11, further comprising the operator scanning the retrieved item from the inbound inventory load, and the warehouse control system determining, based on the scan of the retrieved item, the optimally dimensioned compartment for the decant operator to place the retrieved item.

13. The method of claim 11, further comprising the warehouse control system directing inventory receptacles having empty compartments therein from the ASRS to the decant workstation to be filled with inbound inventory requiring the corresponding empty compartments for storage in the ASRS.

14. The method of claim 13, further comprising the warehouse control system monitoring a pending order list of orders to be fulfilled within the warehouse facility and determining whether inventory items within an inventory receptacle stored in the ASRS will be required for an in-progress order or an order that will be fulfilled within a user-defined period, wherein said directing inventory receptacles having empty compartments comprises the warehouse control system selecting only non-required inventory receptacles with empty compartments, wherein a non-required inventory receptacle is defined as an inventory receptacle that is not required for an in-progress order or an order to be fulfilled within the user-defined period.

15. The method of claim 11, wherein the warehouse facility further comprises a transportation system for transporting the first type of inventory receptacles between the ASRS and the first decant position, and for transporting the second type of inventory receptacles between the ASRS and the second decant position.

16. The method of claim 15, wherein the ASRS comprises a grid-based storage system and the decant workstation is positioned alongside the ASRS, wherein the transportation system comprises a first access port formed in a side wall of the ASRS and a first transfer mechanism to move the first type of inventory receptacles through the first access port between an interior of the ASRS and the first decant position, and comprises a second access port formed in a side wall of the ASRS and a second transfer mechanism to move an inventory receptacle through the second access port between an interior of the ASRS and the second decant position.

17. The method of claim 16, further comprising buffering one of the first type of inventory receptacles adjacent the first access port such that once the inventory receptacle at the first decant position has been filled and transported to the ASRS, the buffered inventory receptacle is immediately available to move through the first access port to the first decant position, and buffering one of the second type of inventory receptacles adjacent the second access port such that once the inventory receptacle at the second decant position has been filled and transported to the ASRS, the buffered inventory receptacle is immediately available to move through the second access port to the second decant position.

18. The method of claim 15, wherein the ASRS comprises an aisle-based storage system, and wherein the transportation system comprises a first conveyor to move inventory receptacles from the ASRS to the first decant position, and comprises a second conveyor to move inventory receptacles from the ASRS to the second decant position.

19. The method of claim 18, further comprising buffering one of the first type of inventory receptacles on the first conveyor adjacent the first decant position such that once the inventory receptacle at the first decant position has been filled and transported to the ASRS the buffered inventory receptacle is immediately available to move to the first decant position, and buffering one of the second type of inventory receptacles on the second conveyor adjacent the second decant position such that once the inventory receptacle at the second decant position has been filled and transported to the ASRS the buffered inventory receptacle is immediately available to move to the second decant position.

20. The method of claim 19, wherein each of the first conveyor and the second conveyor comprises a right angle transfer to transfer inventory receptacles from the respective conveyor to the corresponding decant position, said method further comprising the warehouse control system controlling the right angle transfer of each of the first and second conveyors to move the respective buffered inventory receptacles from the corresponding conveyor to the corresponding decant position.

21. The method of claim 15, wherein the ASRS comprises an aisle-based storage system, the first transportation system comprises at least one automated guided vehicle (AGV) or autonomous mobile robot (AMR) to move inventory receptacles from the ASRS to the first decant position, and the second transportation system comprises at least one AGV or AMR to move inventory receptacles from the ASRS to the second decant position.

22. The method of claim 21, further comprising buffering one of the first type of inventory receptacles on the at least one AGV or AMR at a buffer position adjacent the first decant position such that once the inventory receptacle at the first decant position has been filled and transported to the ASRS the buffered inventory receptacle is immediately available to move to the first decant position, and buffering one of the second type of inventory receptacles on the at least one AGV or AMR at a buffer position adjacent the second decant position such that once the inventory receptacle at the second decant position has been filled and transported to the ASRS the buffered inventory receptacle is immediately available to move to the second decant position.

* * * * *